(12) United States Patent
Carder et al.

(10) Patent No.: US 7,796,809 B1
(45) Date of Patent: *Sep. 14, 2010

(54) 3-D IMAGING SYSTEM WITH PRE-TEST MODULE

(75) Inventors: Kendall L. Carder, St. Petersburg, FL (US); Phillip N. Reinersman, Tampa, FL (US)

(73) Assignee: University of South Florida, Tampa, FL (US)

( * ) Notice: Subject to any disclaimer, the term of this patent is extended or adjusted under 35 U.S.C. 154(b) by 769 days.

This patent is subject to a terminal disclaimer.

(21) Appl. No.: 10/905,098

(22) Filed: Dec. 15, 2004

Related U.S. Application Data

(60) Provisional application No. 60/481,795, filed on Dec. 15, 2003.

(51) Int. Cl.
*G06K 9/00* (2006.01)

(52) U.S. Cl. .............. 382/154; 348/E13.018; 348/81; 348/148; 367/131; 382/153

(58) Field of Classification Search ............ 348/31, 348/42, 146, 81, 148; 382/154; 367/131
See application file for complete search history.

(56) References Cited

U.S. PATENT DOCUMENTS

| | | | |
|---|---|---|---|
| 4,143,400 A * | 3/1979 | Heckman et al. ............... 348/31 |
| 4,448,145 A * | 5/1984 | Hervieu ...................... 114/312 |
| 4,855,961 A | 8/1989 | Jaffe et al. |
| 4,947,782 A * | 8/1990 | Takahashi .................. 114/312 |
| 5,155,706 A | 10/1992 | Haley et al. |
| 5,184,230 A * | 2/1993 | Watson .......................... 359/9 |
| 5,231,609 A | 7/1993 | Gaer |
| 5,321,667 A | 6/1994 | Audi et al. |
| 5,384,589 A * | 1/1995 | Ulich et al. .................... 348/31 |
| 5,543,910 A | 8/1996 | Wallin |
| 5,612,928 A | 3/1997 | Haley et al. |
| 5,687,137 A | 11/1997 | Schmidt et al. |
| 5,784,162 A * | 7/1998 | Cabib et al. ................. 356/456 |
| 5,894,450 A | 4/1999 | Schmidt et al. |
| 5,929,453 A | 7/1999 | Andrews et al. |
| 5,947,051 A | 9/1999 | Geiger |
| 5,995,882 A | 11/1999 | Patterson et al. |
| 6,064,708 A | 5/2000 | Sakamaki |

(Continued)

OTHER PUBLICATIONS

Carder et al., Ocean-Science Mission Needs: Real-Time AUV Data for Command, Control, and Model Inputs, IEEE Journal of Oceanic Engineering, 2001, p. 742-751, vol. 26 No. 4.

*Primary Examiner*—Gregory M Desire
(74) *Attorney, Agent, or Firm*—Thomas E. Toner; Anton J. Hopen; Smith & Hopen, P.A.

(57) ABSTRACT

A remote 3-D imaging system which uses a novel angular relationship to establish the relationship of the image features to the system, which is displayed by virtue of calculations. In addition to static surfaces, moving surfaces may be studied and corrections due to turbidity and platform position are also easily compensated for. A pre-test module is also included which predicts and has the ability to re-adjust the instrumentation to the test conditions as predicted by a hybrid Monte Carlo model. The instant system may also contain a plurality of sensing systems based on light, including traditional reflective or elastic scattering and novel fluorescent or non elastic scattering still and video imaging systems, including time-gated systems.

21 Claims, 8 Drawing Sheets

U.S. PATENT DOCUMENTS

| | | | |
|---|---|---|---|
| 6,118,066 A * | 9/2000 | Sirmalis et al. | 114/20.1 |
| 6,167,831 B1 * | 1/2001 | Watt et al. | 114/322 |
| 6,185,988 B1 | 2/2001 | Baxter, Jr. | |
| 6,223,675 B1 * | 5/2001 | Watt et al. | 114/312 |
| 6,319,079 B1 | 11/2001 | Cooper | |
| 6,474,254 B1 * | 11/2002 | Ambs et al. | 114/312 |
| 6,622,799 B2 * | 9/2003 | Dean | 166/381 |
| 6,707,761 B2 * | 3/2004 | Erikson | 367/131 |
| 6,839,082 B2 * | 1/2005 | Lee et al. | 348/81 |
| 6,865,139 B2 * | 3/2005 | Hudson | 367/131 |
| 7,417,666 B2 * | 8/2008 | Kaltenbacher et al. | 348/81 |
| 2002/0044202 A1 * | 4/2002 | Lee et al. | 348/42 |
| 2002/0071345 A1 * | 6/2002 | Chiang et al. | 367/138 |
| 2004/0027919 A1 * | 2/2004 | Erikson | 367/88 |
| 2005/0007448 A1 * | 1/2005 | Kaltenbacher et al. | 348/42 |
| 2006/0008137 A1 * | 1/2006 | Nagahdaripour et al. | 382/154 |
| 2006/0114748 A1 * | 6/2006 | Rogers | 367/88 |
| 2007/0010946 A1 * | 1/2007 | Macfarlane et al. | 702/1 |

* cited by examiner $$R = S \bullet \tan \left\{ \emptyset + \frac{row\# \bullet F.O.V.}{totalrows} \right\}$$

Where:

Total rows = total # of vertical imaging elements or pixels row# = current row where line is detected R = the distance between the source and the detector S = the distance between the source and the detector F.O.V. = the field of view as seen by the detector in relation to the object $\emptyset$ = the vertical angle between the illumination beam and the upper edge of the field of view of the camera

FIG. 6

3-D IMAGING SYSTEM WITH PRE-TEST MODULE

CROSS REFERENCE TO RELATED APPLICATION

This application claims priority from U.S. provisional application Ser. No. 60/481,795, bearing the same title and with identical inventorship, filed Dec. 15, 2003.

STATEMENT OF GOVERNMENT INTEREST

The work that led to this invention has been supported in part by a grant from the Office of Naval Research, Grant Number N00014-01-1-0279. Thus, the United States Government may have certain rights to this invention.

BACKGROUND OF THE INVENTION

Interest in the profile of underwater surfaces has grown significantly in the past several decades. Indeed, the ability to map and detect features in the underwater environment have become of interest in the areas of science, resource exploration and national defense, to name a few. This has led to the development of various types of instrumentation for imaging the areas of interest.

One type of imaging system employs the use of sonar and translates the differences in the echo signal to locate abnormalities in a body of water. U.S. Pat. No. 5,321,667 to Audi et al represents such a system. These systems are adapted to generate information over a large scan area, but are limited in degrees of resolution based on the ping rates and distance to the object.

A multi-platform system for ac surveillance is disclosed in Gaer, U.S. Pat. No. 5,231,609. Here, a plurality of acoustic platforms aid in providing an accurate sonic image or shadow. Because of the use of more than one signal to produce the image, Gaer is able to track a moving object, but this system requires a highly sophisticated interfacing of the actual signals and signal generators to provide that information, thus making it a very expensive system and one that, by virtue of the amount of variables to be controlled, is hard to keep in synchronization.

Another system, which employs a plurality of platforms, is disclosed in Schmidt et al, U.S. Pat. No. 5,894,450. This multi-AUV system is able to collect a profile of data by virtue of collecting the single data sets obtained by the AUVs and collating the same. This again is a highly expensive and complicated system to use.

Another imaging system is described in Haley et al, U.S. Pat. No. 5,155,706. Here the data obtained from different passes over the image are manipulated according to an algorithm to produce a clearer image of the desired object or feature. This system, although being lower cost and easier to use than the multi-platform systems, still is incapable of producing high-resolution 3-I) images.

An additional patent to Haley et al. U.S. Pat. No. 5,612,928, also describes a pixel classifying system, but again this system is incapable of producing 3-0 images of photo quality.

Jaffe et al, U.S. Pat. No. 4,855,961 describes another sonar imaging system employing a plurality of transmitters in conjunction with a plurality of receivers to assist in establishing a 3-D image of the object. This system, since again it uses sonar for imaging, is still limited in the degree of resolution available.

Another method of determining the size of an object by virtue of measurements at known spaces apart is taught by Wallin in U.S. Pat. No. 5,543,910. Here, the size of an object is calculated based on a geometric model with two signals being sent from two different periscopes and at two differing angles with respect to the host devices to determine the actual distance via the geometric model from the feedback. This system again only is capable of location and is not an imaging system per se.

Use of video cameras is also known in the art. Cooper. U.S. Pat. No. 6,319,079 describes a system with the video camera which sends back images from the underwater site. Nothing is reported about the quality of those images and the problems that the video camera solves. This device is also limited in that it requires a diver to operate the equipment.

Geiger, U.S. Pat. No. 5,947,051 also describes a system with a camera attached to it and discusses 3 images. He uses a system with a lidar x-y raster scanning laser beam instead of a video type of camera to obtain images. Because of the raster feature, this differs from a single fixed source. In addition, a TV camera is also disclosed as an alternate embodiment, but there is no discussion of any compensation means for the turbidity problems that underwater optical imaging can experience.

Patterson et al., U.S. Pat. No. 5,995,882, also describes a system with a video camera. Again, no discussion on how the images are enhanced or obtained in sufficient clarity to produce accurate representations of the object under investigation is made. The use of fluorescence to detect organic materials is taught in Andrews, U.S. Pat. No. 5,929,453. In this reference a spectrometer type of instrument is used to detect trace organics for oil spill determination but the system is not part of a moving or scaring type of device.

Finally, Schmidt et al, U.S. Pat. No. 5,687,137 describes a combination wide-scale and smaller scale measurement system which can be programmed to respond to a signal instructing it to return to an area of interest and activate finer measurements via tomography. This system, although it is sonic in design is capable of both broad scanning and finer types of scans. No imaging specifics are addressed in this patent.

SUMMARY OF INVENTION

This invention relates to the field of imaging and the in situ evaluation of the properties of surfaces or features of interest, More particularly, the instant invention relates to a system for inspecting the surface characteristics of a vessel or the ocean floor using a tethered or autonomous vessel designed to accurately image the surface under inspection to locate abnormalities or features of interest.

In one embodiment, the present invention includes a 3-dimensional imaging system comprising a platform, at least one illumination source affixed to the platform adapted to transmit light to a subject surface, at least one recorder affixed to the platform adapted to receive light generated by the illumination source and reflected from the subject surface, and a pre-test module communicatively coupled to the platform. In alternate embodiments, the platform can be either mobile or stationary and be located above, below, or on the water's surface.

The illumination source can be any such source known in the art, such as a laser and can be movably mounted on the platform. The illumination source can be further coupled with a filter adapted to screen out at least one predetermined wavelength. In alternate embodiments, the illumination source emits a wavelength chosen from the group consisting of the ultraviolet, infrared, and visible spectrum.

In yet another embodiment, the recorder of the instant invention is chosen from the group consisting of still cameras, video cameras, fluorescent detectors and digital recorders. Like the illumination source, the recorder can be movably affixed to the platform. The illumination source can also be communicatively coupled to the recorder.

The platform can also be equipped with a navigational device, such as those as known in the art, including a GPS receiver, compass, and gyronavigational systems.

In addition to an illumination source, the platform can be equipped with a fluorescent analysis system and the recorder can be equipped with a combination of red and green detectors. In one embodiment, the illumination source emits light with a wavelength of about 532 nm. A beam splitter, such as a mirror, can be incorporated into the 3-D imaging system as well.

In yet another embodiment, a pre-test module, possibly comprising a remote sensing device, is affixed to the platform.

BRIEF DESCRIPTION OF THE DRAWINGS

For a fuller understanding of the nature and objects of the invention, reference should be made to the following detailed description, taken in connection with the accompanying drawings, in which:

FIG. 6 depicts the equation by which the digital image is generated whereby the height and geometric features of an object can be represented both visually by the camera and digitally; where Total rows=total # of vertical imaging elements or pixels; row # current row where line is detected; R=the distance between the source and the detector; S=the distance between the source and the detector; F.O.V.=the field of view as seen by the detector in relation to the object; and ø =the vertical angle between the illumination beam and the upper edge of the field of view of the camera.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Therefore it is an advantage of the instant invention to provide an imaging system for underwater profiling that is capable of minute definition.

Another advantage presented by the instant invention is an imaging system based on non-acoustic imaging.

It is a further advantage of the invention that an imaging system based on visual imaging that is capable of compensating for turbidity and other conditions deleterious to visual imaging in underwater environments by virtue of a pre-test module.

It is still a further advantage of the invention that an imaging system based on differences in fluorescence to determine surface characteristics of underwater objects is provided.

It is still a further advantage of the invention that an imaging system that quantitatively discriminates surfaces using various reflectivity and fluorescence is provided. Characteristics to determine surface properties of underwater objects including material type, age of submersion and the characteristics of the algal population contributing to the fluorescence signature which provides clues to fingerprinting the algal source as well as its stages of development.

It is yet an additional advantage of the invention to provide a total profiling system based on acoustic, video and chemiluminescent properties incorporated into one system.

It is another advantage of the invention to provide a pre-test module to evaluate the test conditions prior to testing to establish efficiency of the system and to make adjustments or to abandon testing based on those findings. Still additional advantages will become apparent as the invention is further described.

Figure 1:
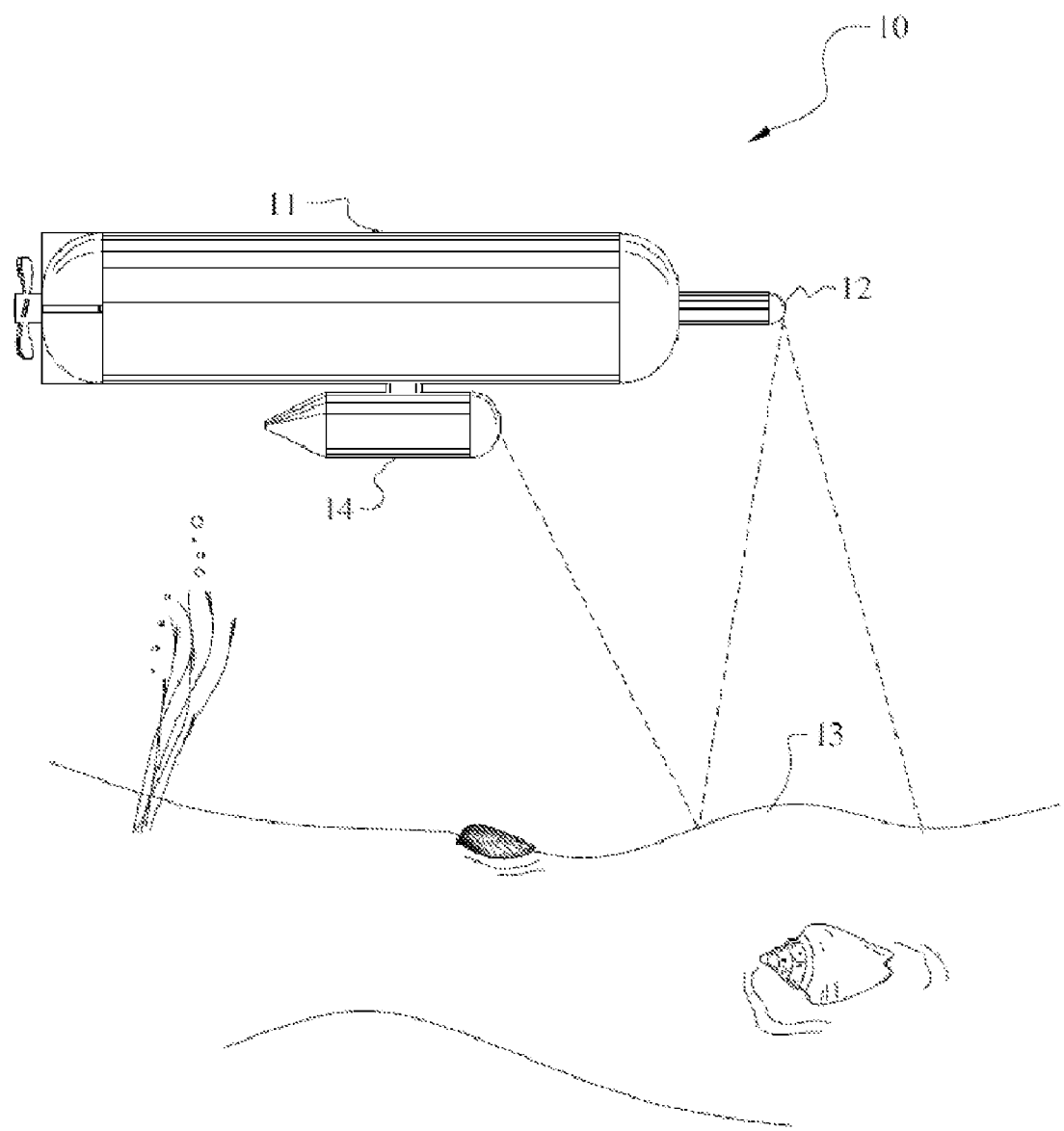
FIG. 1 represents a bi-static camera viewing light from a fan-beam laser reflected off the bottom and objects thereon. The pixel with the brightest radiance per image column is saved as a measure of the object, and the position of the pixel provides a measure of the range to the object.

Referring now to FIG. 1, the instant system 10 includes a platform 11 which 10 contains an illumination source 12 which is directed to a surface 13, which is in turn recorded by virtue of a recorder 14.

The platform 11 may be of any design for conveying the imaging apparatus, these including AUV's, ROV's, and other underwater conveying means. In addition boats or ships may be outlined with the apparatus of the instant invention. The imaging may occur below, above, on the surface of a body of water or as a side-scanning function with respect to the horizontal axis of the platform. In addition, if aerial observation is intended as the use, any form of manned or unmanned vehicle may be used as the supporting and impelling means. Also contemplated is the use of stationary underwater platforms geared to image ships or other water vessels as they pass over it. However, for the purposes of one embodiment of this application, ROVs or AUV are the preferred platforms.

The illumination source 12 may also be any suitable illumination source known to one of ordinary skill in the art, but for the purposes of this embodiment, is a laser source. This source may be selected as a narrow wavelength source as desired for the fluorescence embodiment of the instant invention, or may be of a broader range of wavelengths for more general illumination. In addition, a single source may be used or a plurality or sources, including use of multiplicity of different types of illumination devices as known to those of ordinary skill in the art. The source or sources are preferably movably mounted to provide flexibility in changing the source to detector separation as desired. It is considered preferable to use a very high intensity laser source so that a high degree of illumination is achieved from this source, in addition, various filter mechanisms may be used in combination with the light source to screen out or isolate certain wavelengths. In one mode, the source should have a narrow field of view in the along-track direction such as provided by a spot or cross-track-dispersed fan beam.

The surface 13 may be any desired surface for inspection. Some of these include, but are not limited to, sea floor, ship's hulls, sea walls and objects resting on the sea floor or tethered thereto and floating objects. It is understood for the purposes of this application that the term "sea" encompasses any body of water, fresh or salt in nature and of any size. In the case of ship's hulls, the instant imaging is arranged so that the illumination is directed to a side-facing surface or even an upwardly facing surface, such as the actual bottom of a ship. In addition, in the above water embodiments, the apparatus may be used to image tops, sides or bottoms of objects of interest.

The recorder 14 may comprise any type of known device to those of ordinary skill in the art such as still cameras, video cameras, computer digitization and graphic representations. In addition, it is contemplated that a plurality of varying, or similar, recorders may be used jointly either solely or in combination to provide information storage and display. The recorder is preferably also movably mounted to allow for adjustments in the source to detector separation as desired. It is anticipated that both real time imaging and data storage would be the recorder of choice in the preferred embodiments. In addition, any known camera enhancement systems may be employed, including filters and focusing means, these systems readily known and available to one of ordinary skill in the art.

Figure 2:
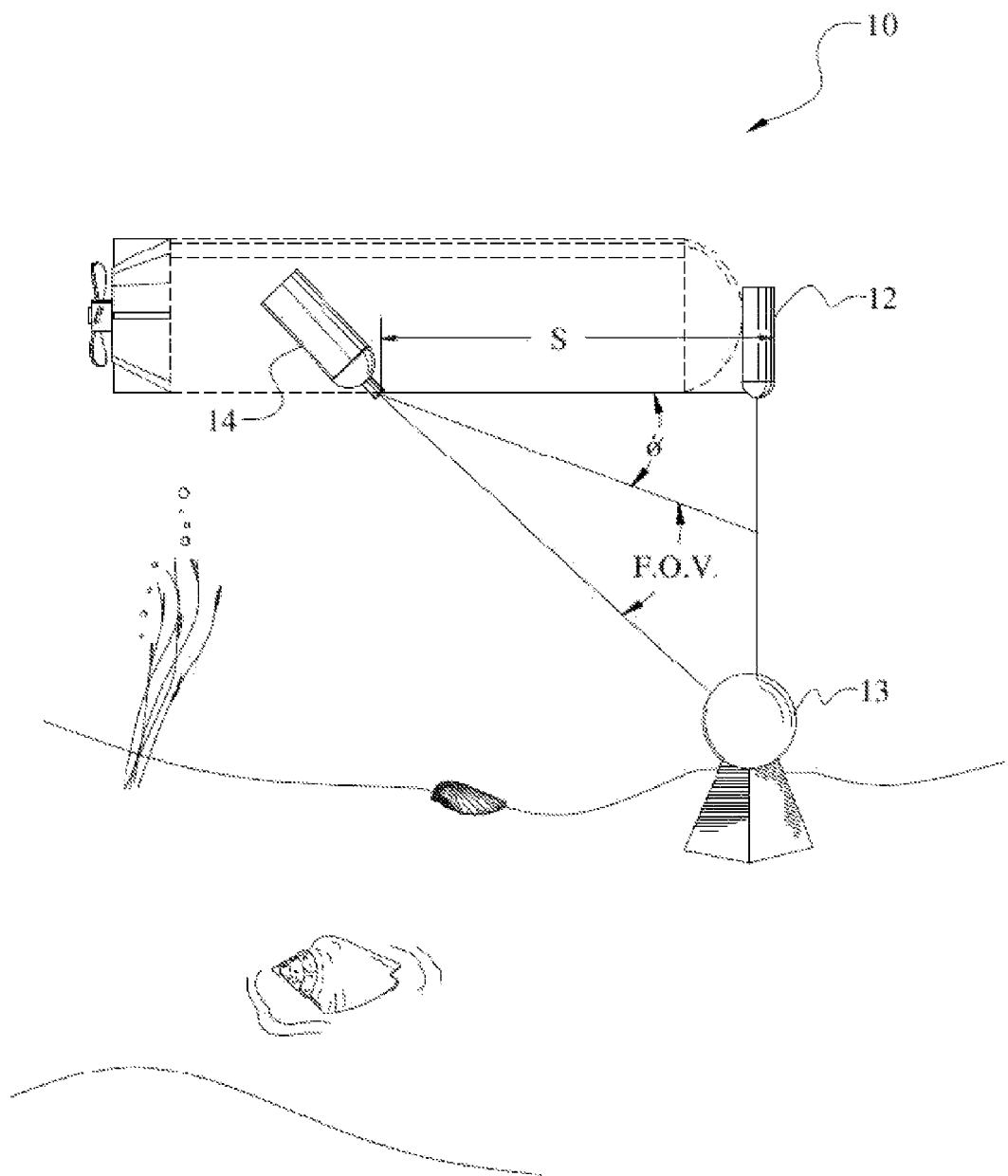
FIG. 2 is a more detailed showing of the imaging portion with respect to the algorithm values used for results calculation of the instant invention.

FIG. 2 is a detailed representation of one embodiment of the instant invention. In this embodiment the narrow-beam illumination source 12 is directed downward toward the object 13 and recorded by recorder 14. By virtue of their fixed relationship to one another, the height and geometric features of the object 13 can be represented both visually by the camera and digitally by virtue of the digital image generated by the calculations made by the equation shown in FIG. 6; where Total rows=total # of vertical imaging elements or pixels; row# current row where line is detected; R=the distance between the source and the detector; S=the distance between the source and the detector; F.O.V.=the field of view as seen by the detector in relation to the object; and ø =the vertical angle between the illumination beam and the upper edge of the field of view of the camera.

Because the illumination source 12 and recorder 14 are separated and not coaxial, backscatter effects from the illumination source due to the presence of particulates in the water are reduced. In addition, the calculated digital image offers a graphic representation of the image either in combination with the visual image or as a sole product of the imaging apparatus. It will be understood that a total visual image is also possible without digitization in addition. Thus, when an illumination beam is fanned out across the vehicle path and viewed with a camera, the equations, set forth above, can be developed in 3-D dimensions for each point where the fan beam hits a solid object.

The 3-D image of the subject object is calculated as the distribution of the progression in the values of R as each sequential line is recorded as assessed according to the equation above and the removal or subtraction of the height of the background such as the actual sea floor. Because the emitted light from the illumination source 12 is adjusted to be a fine thin line for calculation purposes, the resultant image obtained is actually a compilation of a large plurality of sequential lines calculated back to the R value with adjustments made for variation in intensity, these being a function of both the R value and a compensated value obtained algorithmetically. Due to the fact that light within the water milieu is subject to varying amounts of scattering, the algorithmic adjustment is necessary to compensate for these scattering effects in the aqueous environment.

Figure 3:
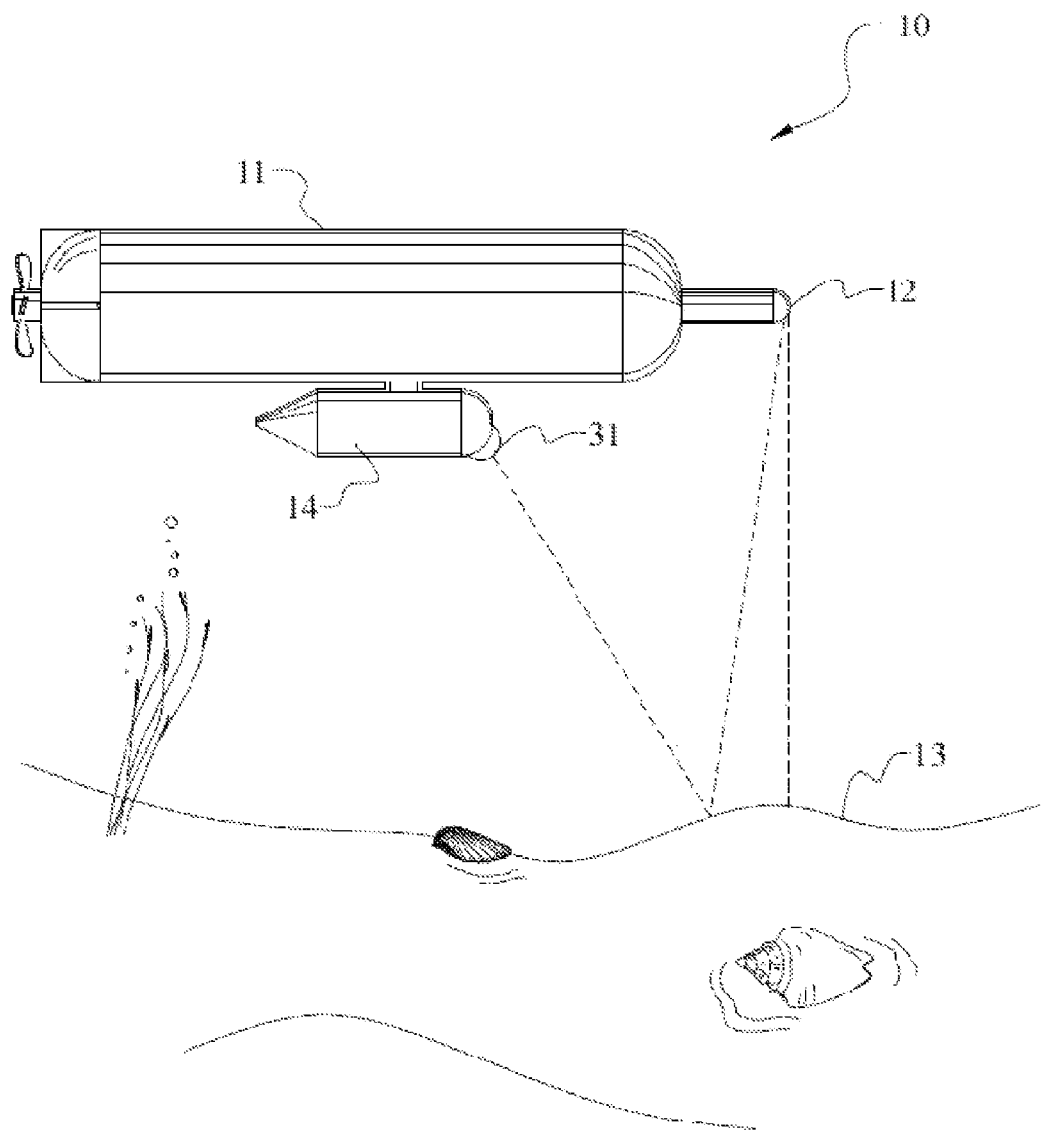
FIG. 3 shows another embodiment of the instant invention having a filter means 20 for fluorescent detection.

An additional adjustment is also made to incorporate navigational as well as vehicle speed data into the final positional equation so that a more accurate location is pegged to the object. This is achieved by incorporation of navigational sensors or sensor systems which are attuned to respond to GSP, compass, gyro navigational systems or others such systems as known to those of ordinary skill in the art. In addition, compensation for the pitching and rolling of the platform is also taken into account so that the accuracy of the depiction of the image obtained is increased. By use of compensation, a more exact location is achieved with respect to a fixed object as well as the ability to locate objects on a moving surface also being possible. This enables scanning of ship hulls for foreign objects relative to fixed positions along their extent while they are under way or drifting. In a further embodiment of the instant invention, as depicted in FIG. 3, a fluorescent analysis system is used either solely or in combination with the camera system or other alternative systems. In this embodiment the camera or other detection means is replaced with a fluorescent detection means. This enables analysis of organic material present on the surface of the subject object. This particular knowledge is useful when a determination is necessary to ascertain the amount of time a particular surface has been in the aqueous environment with respect to other surfaces in the environment. For example, if an object has been recently added to a ship's hull, the amount of organic material present in that portion of the hull will be less than an the surrounding surfaces, and if that object is not otherwise accounted for by recent repair activities, then it may be of a suspicious nature. This type of knowledge is very helpful when it is desired that ships entering a possible port be free of possible terrorist-connected activity or when a ship may have been in some other way compromised in its integrity.

In order to effect the fluorescent embodiment of the instant invention, it is desired that the illumination source 12 illuminates at the desired wavelength. As known to those of ordinary skill in the art, for example, the use of a green light illumination at 532 nm is absorbed by organic material and fluoresced at 685 nm in the red range. Thus, if a scanning system is used where a combination of green and red detectors are reading the backscattered light, a change in the concentration of the organic material changes the ratio of the green/red returned signals. In this way, as the surface is scanned, if a new portion has been recently added, then the amount of red given off by that material goes to zero and the ratio instantly signals that a surface change is present.

Figure 8:
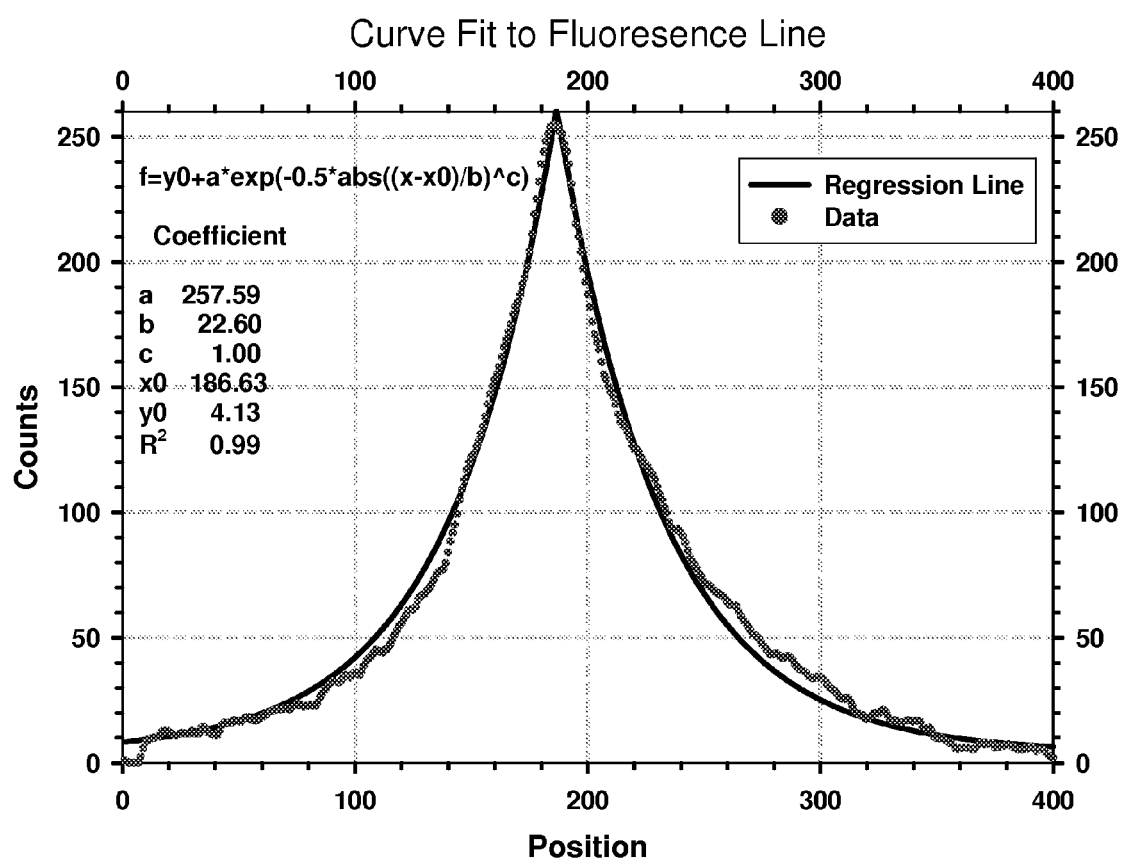
FIG. 8 is a graph showing a profile across a line of fluorescent response to a 532 nm laser fan beam projected on a boat hull in Bayboro Harbor. 685 nm fluorescence results from algal build-up over 5 weeks.

Profile across a line of fluorescent response to a 532 nm laser fan beam projected on a boat hull in Bayboro Harbor is shown in FIG. 8. 685 nm fluorescence results from algal build-up over 5 weeks. Note the model has a 5th order Gaussian shape, but the exponentials on either side of the maximum are of order 1.0. The shape shown in FIG. 8 results primarily from forward scattering at 532 nm by particles in the path toward the hull, where antenna pigments in hull algal buildup are hit and the energy transferred to chlorophyll a molecules which fluoresce. There is no path radiance on return at 685 nm except where chlorophyll in path phytoplankton is stimulated. A similar shape is found for elastic returns at 532 nm. Range limits where this model can fit laser-line data are 8.5 and 6 e-folding depths for elastic and inelastic modes.

The illumination source itself may be tuned to a specific wavelength or wavelengths or an appropriate filter may be used in concert with the source to tune the emitted light. This is also true of the detection means which may also have attenuating means connected with it to aid in selection of the desired wavelength. Of course, in order to maximize sensitivity with less costly illumination sources and detectors, it is preferable to use a filter at both the source and detection portions of the analytical equipment. This choice as well as the choice of the specific source detector and filter are well within the scope of ordinary skill in the art. It is further contemplated that the illumination source may also be a pulsed or strobed source. This "time-gating" enables synchronization of the source with the detectors so that effects of outside interference are minimized. By collecting light only during the appropriate positive pulses of the time-gates, the speed of light in water, and the distance to the surface of interest, the effects of ambient light on the system arc reduced. Motion blur effects can also be reduced in a pulsed system.

It is also contemplated that a simpler version of the fluorescence system may be used without the dual ratio calculating capacity. Thus a green-green system, a red-red system, a green-red system, a red-green system or even multi-source illumination in the blue and green regions are possible with a red receiver/sensor. This would allow discrimination of the type of organism involved in bio-fouling which results in fluorescence. In addition a broad wavelength system may also be used for material analysis of the surface, excluding the presence of organic material and instead directed to the presence of foreign materials on the surface of the scanning target. It is further contemplated that any analytical system based on reflected light may be incorporated into the instant system. These may be used for metals, plastics, or even fibrous materials or other light detectable materials as so desired by one of ordinary skill in the art.

In addition to the single illumination source and single camera system of FIGS. 1-3, a plurality of sources, cameras and/or detectors and, indeed, the combination of both a plurality of detection means and sources is also contemplated by the inst t invention. The addition of a plurality of analysis systems allows for the simultaneous assessment of a variety of surfaces or for the performance of a multiple types of analysis at one time. This is particularly helpful when it is desired to scan the entire surface of an object without changing the direction of movement of the platform.

Figure 4:
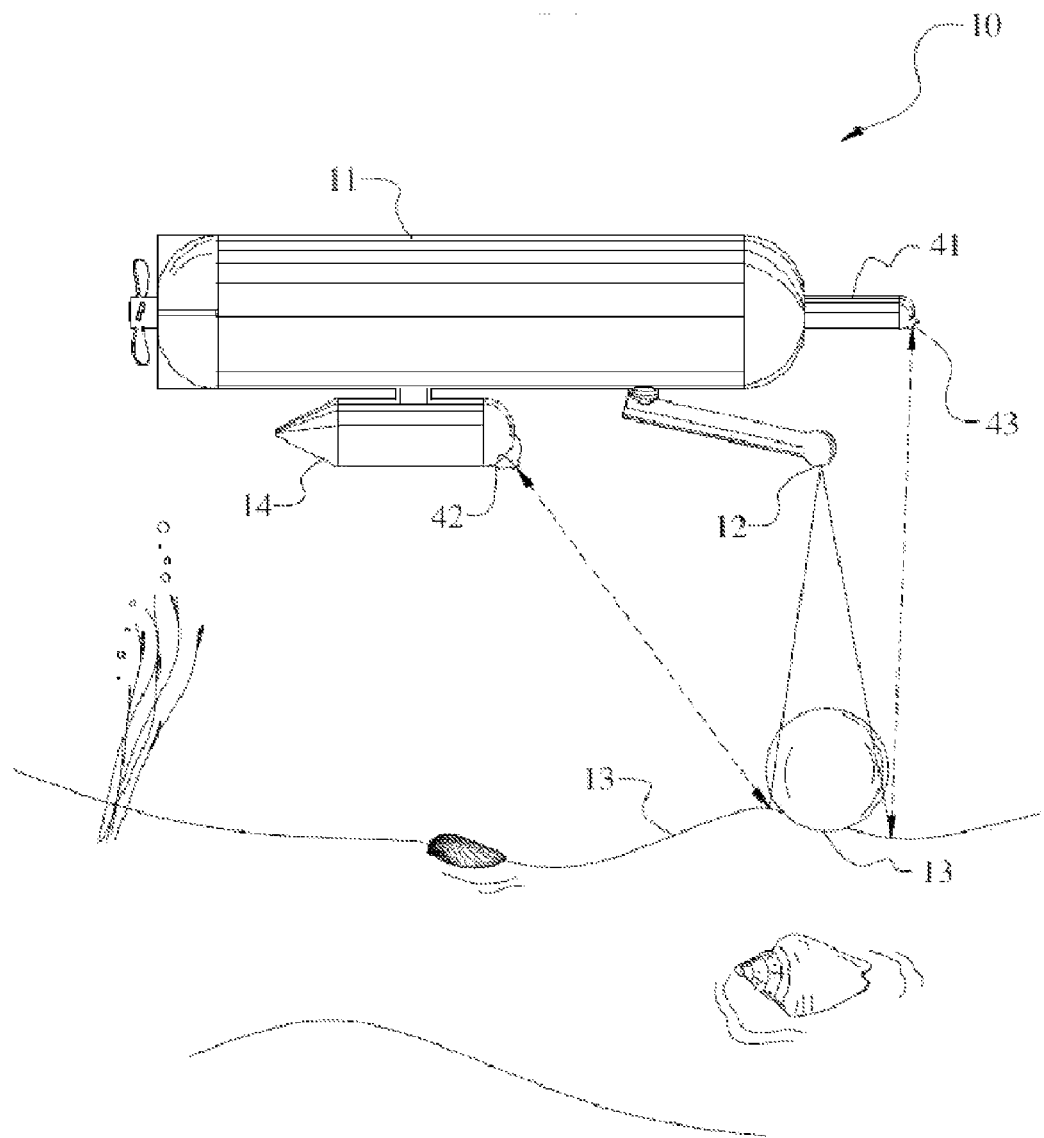
FIG. 4 shows a further embodiment of the instant invention with two cameras for simultaneous viewing of a plurality of sides of the subject object.

This type of embodiment is shown in FIG. 4. Here, a single illumination source 12 supplies the light incident on object 13 which is reflected back to the two cameras 14 and 41 through lenses 42 and 43. It is also contemplated that a dual source, single detection system may also be used. By use of this geometry, it is possible to examine a multiplicity of surfaces with the platform moving only once over the object's location. This is particularly useful when the object or desired feature for study is then calculated back to a specific position or position on a subject surface. Thus the need for a multiplicity of pass over the object is obviated and the inherent problems of having to compensate for the new directional parameters are not present. This affords the user a simpler method of not only performing the scan, but also allows for analyses to be made under a wider variety of conditions such as rough water or on free-floating ship's surfaces. Because a single set of operating parameters is presented for calculation purposes the resultant system is easier to handle and the data thus obtained are more reliable. In addition, by use of a single scan over a multiple direction scan, the optimum single direction whether it is chosen due to water conditions or because of its relation to another feature or surface may be examined without having to gather performance data a plurality of times with respect to direction.

Figure 5:
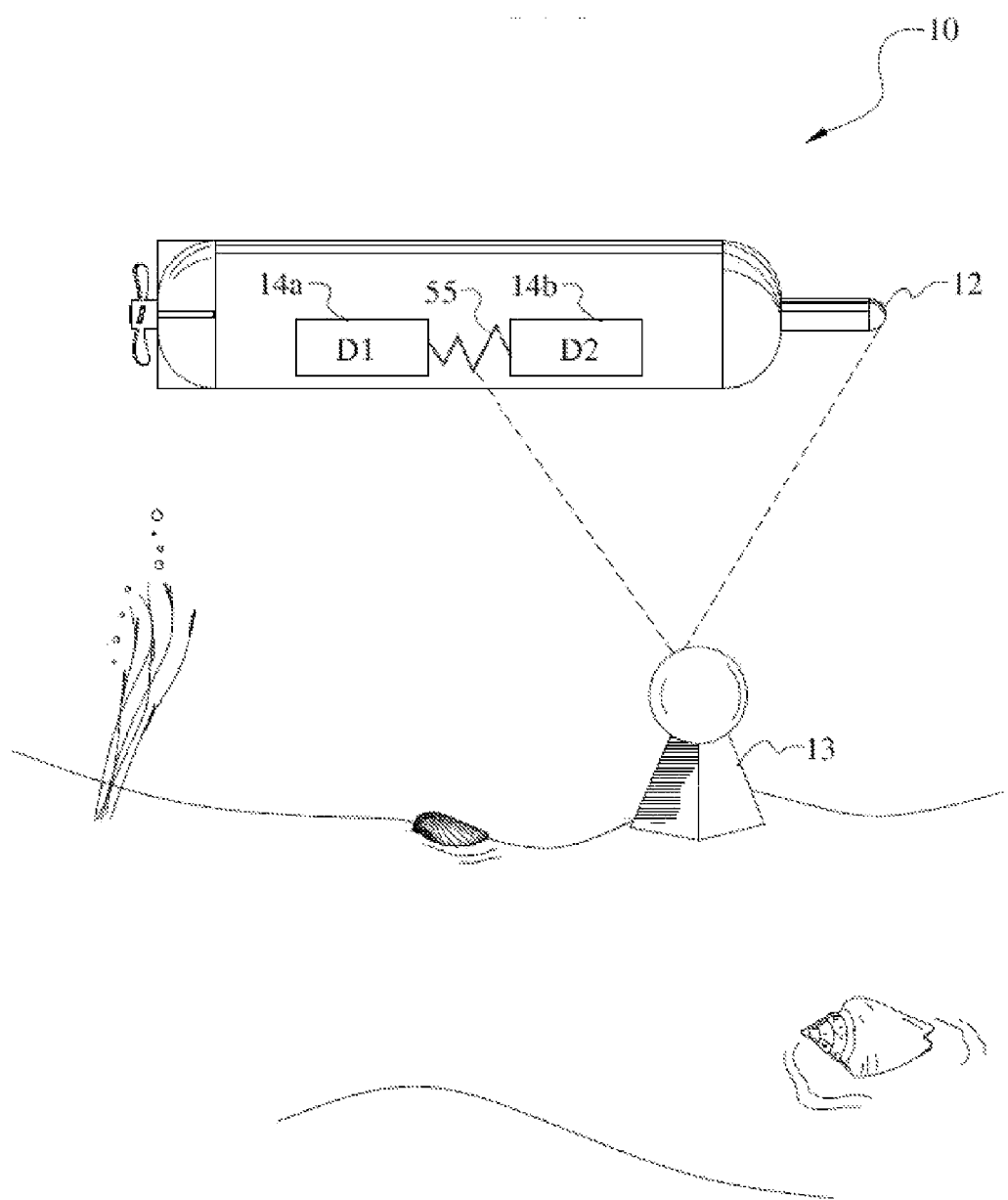
FIG. 5 shows a further embodiment of the invention including a beam splitting device for channeling the reflected light into multiple detector systems.
Figure 7:
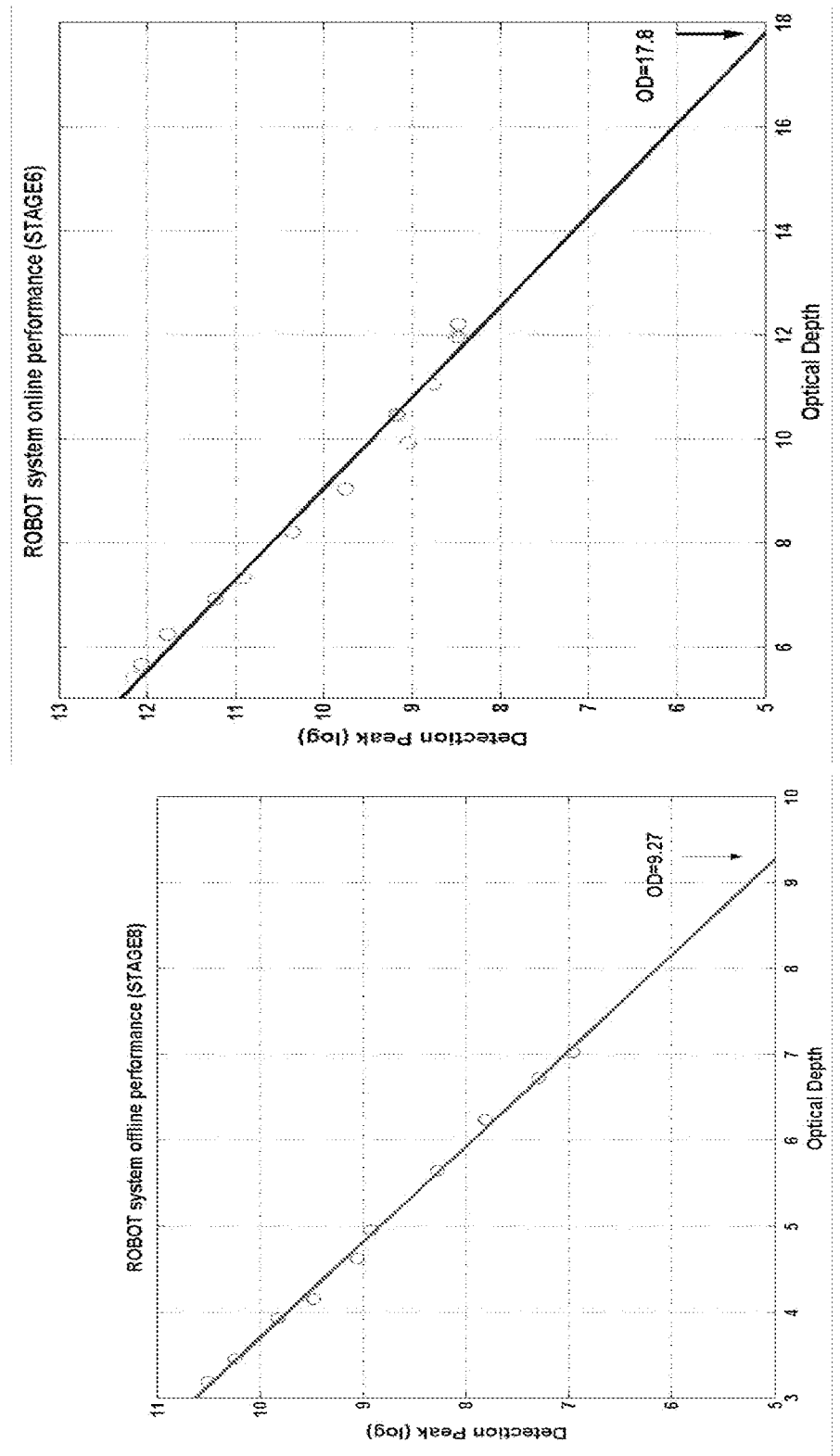
FIG. 7 are graphs demonstrating performance of the current invention in Tampa Bay providing estimates of 2-way range limits of about 9 optical lengths (1/c) for the fluorescence mode (left) and near 18 optical lengths for the elastic mode (right).

In the embodiment depicted in FIG. 5, an additional beam-splitting device 55 is inserted into the system. This device serves to physically divide the reflected signal into a plurality of equal components which are then conveyed into separate detectors such as 14a and 14b. This device may be a mirror type of device or any other reflective type of device available to one of ordinary skill in the art. This embodiment shows two detectors, but it is considered within the scope of the invention that any number of detection means may be chosen as desired by the particular application. If desired, each detector may be tuned to a different frequency or wavelength for simultaneous multi-spectral imaging. In this fashion, 3-D and fluorescent imaging can occur simultaneously.

In addition, the location or locations of the cameras or detection means and the illumination source or sources may be moved to any desired location along the extent of the platform. This enables the artisan to stabilize the analysis system with respect to the movement of the platform and serves to reduce the effects of motion on the camera and illumination equipment. Also, by selectively locating the camera with respect to the body of the platform, the effects of pitch and yaw in rough conditions can be minimized by using the platform body as a stabilizer.

It is also contemplated that a plurality of geometries for the actual target of the illumination source 12 may be used. Thus the system 10 may be configured with respect to the platform for scanning not just under the platform as shown in FIG. 1, but also above and sideways with respect to the longitudinal axis of the platform. When a plurality of illumination and detection/camera systems are used, a combination of configurations is possible. The ability to locate the scanning system or systems is considered within the scope of ordinary skill in the art and can be chosen for the desired application.

It is also contemplated that additional types of analysis systems may be added to the platform in order to vary the type of analyses made by the instant system. Some of these include, but are not limited to, sonar systems, fluorescence systems, and other sensor based systems which may be used to monitor a variety of additional parameters simultaneously. In addition, when it is desired, other spectroscopic systems may also be used, including those operating in the UV, IR and visible ranges.

In order to effect the fluorescent or other spectroscopic embodiments of the instant invention, it may be desired that the illumination source 12 be tuned to give the desired wavelength. In addition, the detection system may also be tuned to screen out undesired backscattered light and to optimize the readout of the system. Also, any combination of tuned and un-tuned detectors and sources are considered within the scope of the instant invention and are a matter of choice as desired for particular applications. The tuning means may be an optical filter system or other means as known to those of skill in the art. Indeed, if a laser source is used, the laser itself may be tuned or, in the interest of economy, a separate tuning means may be us in conjunction with the laser.

As known to those of ordinary skill in the art, as discussed before, the use of a green light illumination at 532 nm is reflected back at 685 nm in the red range due to the presence of the organic material. Thus, if a scanning system is used where a combination of green and red detectors are reading the backscattered light, then if a change in the concentration of the organic material changes the ratio of the green/red returned signals. In this way, as the surface is scanned, if a new portion has been recently added, then the amount of red given off by that material goes to zero and the ratio instantly signals that a surface change is present. By use of appropriate optical filters and tuning means the source and detectors may be optimized for a specific set of wavelengths.

In an additional embodiment, it is also possible to include a pre-test module for standardization or instrument performance predictability. This may be accomplished by use of a modified Monte Carlo method which predicts the instrumental operating efficiency given a set of parameters for any given time frame. Some of these parameters include, but are not limited to, water conductivity, temperature, sun angle, cloudiness, depth water turbidity and other parameters such as absorption and scattering coefficients, as known to one of ordinary skill in the art that are known to affect the transmission of light in a test medium. After making the measurement of these condition parameters, using the hybrid Monte Carlo model an understanding of the optical environment for that period of time is made by using a look-up table or computer program. From that analysis it is possible to understand instrument performance, and a decision to make adjustments may be made to optimize instrumental output, or alternately, to ever abandon testing due to lack of feasibility for those conditions.

The specific parameters may be obtained by a number of means including remote sensing devices, instrumented buoys, or sensor modules located on the AUV or ROV system itself. In the case of a module, this module may contain underwater sensors as well as above water systems and telemetry devices for relaying the information back to a command system. Thus, when this module is activated, the AUV or ROV system may take sequential measurements of parameters on the surface and the underwater measurements with relay of the readings back to the controller. This relay may be made by the tether system on a ROV system or by standard underwater acoustic modem techniques if an AUV system is used.

The module may also be self-contained with appropriate PC support to enable an instrumental adjustment to be made as a result of the readings in situ instead of having the system used to relay information to a remote site where either PC inputs are implemented or a human monitors the results and makes the necessary decisions or instrument modifications back via the relay system. The use of automated versus non-automated or degrees of automation is entirely within the scope of those of ordinary skill in the art.

In addition to human monitors, the system may use threshold programs to determine feasibility of operation or control programs to readjust settings to accommodate the instant conditions. The choice of any of these options is available to the ordinary skilled artisan as well as the particular equipment used. The module enables a more realistic understanding of the quality of the data obtained by the test equipment and the reliability of the results for the conditions at the time of testing.

Modification and variation can be made to the disclosed embodiments of the instant invention without departing from the scope of the invention as described. Those skilled in the art will appreciate that the applications of the present invention herein are varied, and that the invention is described in the preferred embodiment. Accordingly, additions and modifications can be made without departing from the principles of the invention. Particularly with respect to the claims it should be understood that changes may be made without departing from the essence of this invention. In this regard it is intended that such changes would still fall within the scope of the present invention. Therefore, this invention is not limited to the particular embodiments disclosed, but is intended to cover modifications within the spirit and scope of the present invention as defined in the appended claims.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be the to fall therebetween. Now that the invention has been described,

What is claimed is:

1. A 3-dimensional optical imaging system comprising:
a platform;
at least one illumination source affixed to the platform adapted to transmit light to a subject surface;
at least one recorder affixed to the platform adapted to receive light generated by the illumination source and reflected from the subject surface;
a data processing system in communication with the at least one recorder for compiling data obtained from the reflected light to produce a 3-dimensional optical image therefrom; and
a pre-test module communicatively coupled to the platform and adapted to collect environmental condition parameters and adjust the system based on the environmental condition parameters to establish an improved optical image.

2. The system of claim 1 wherein the platform is mobile.

3. The system of claim 1 wherein the platform is stationary.

4. The system of claim 1 wherein the illumination source is a laser.

5. The system of claim 1 wherein the illumination source is movably affixed to the platform.

6. The system of claim 1 wherein the illumination source is coupled with a filter adapted to screen out at least one predetermined wavelength.

7. The system of claim 1 wherein the illumination source emits a wavelength chosen from the group consisting of the ultraviolet, infrared, and visible spectrum.

8. The system of claim 1 wherein the recorder is chosen from the group consisting of still cameras, video cameras, fluorescent detectors and digital recorders.

9. The system of claim 1 wherein the recorder is movably affixed to the platform.

10. The system of claim 1 wherein the illumination source is communicatively coupled to the recorder.

11. The system of claim 1 wherein the platform is equipped with a navigational device.

12. The system of claim 11 wherein the navigational device is chosen from the group consisting of a GPS receiver, compass, and gyronavigational systems.

13. The system of claim 1 wherein the platform is equipped with a fluorescent analysis system.

14. The system of claim 13 wherein the recorder is equipped with a combination of red and green detectors.

15. The system of claim 13 wherein the illumination source emits light with a wavelength of about 532 nm.

16. The system of claim 1 further comprising a beamsplitter.

17. The system of claim 16 wherein the beam splitter is a minor.

18. The system of claim 1 wherein the pre-test module is affixed to the platform.

19. The system of claim 1 wherein the pre-test module comprises a remote sensing device.

20. The system of claim 1, wherein the environmental condition parameters are environmental condition parameters that effect the transmission of light.

21. The system of claim 1, wherein the pre-test module is further adapted to predict the system's instrumentation operating efficiency using the environmental condition parameters.

* * * * *